United States Patent
Togashi

(10) Patent No.: US 9,399,392 B2
(45) Date of Patent: Jul. 26, 2016

(54) DOOR WEATHERSTRIP FOR MOTOR VEHICLES

(71) Applicant: KINUGAWA RUBBER IND. CO., LTD., Chiba-shi, Chiba (JP)

(72) Inventor: Tomokazu Togashi, Chiba (JP)

(73) Assignee: KINUGAWA RUBBER IND. CO., LTD., Chiba-shi (JP)

( * ) Notice: Subject to any disclaimer, the term of this patent is extended or adjusted under 35 U.S.C. 154(b) by 0 days.

(21) Appl. No.: 14/676,263

(22) Filed: Apr. 1, 2015

(65) Prior Publication Data

US 2015/0283888 A1   Oct. 8, 2015

(30) Foreign Application Priority Data

Apr. 2, 2014   (JP) ................................. 2014-075861

(51) Int. Cl.
*E06B 7/16* (2006.01)
*B60J 10/00* (2016.01)
*B60J 10/08* (2006.01)

(52) U.S. Cl.
CPC ............ *B60J 10/004* (2013.01); *B60J 10/0002* (2013.01); *B60J 10/08* (2013.01); *B60J 10/246* (2016.02)

(58) Field of Classification Search
CPC ........ B60J 10/004; B60J 10/08; B60J 10/002; B60J 10/0002; B60J 10/06
USPC .................................... 49/479.1, 498.1, 489.1
See application file for complete search history.

(56) References Cited

U.S. PATENT DOCUMENTS

| | | | | |
|---|---|---|---|---|
| 4,374,880 A | * | 2/1983 | Mesnel | 428/36.9 |
| 4,616,446 A | * | 10/1986 | Okamoto | 49/441 |
| 4,894,953 A | * | 1/1990 | Nozaki | 49/440 |
| 5,155,938 A | * | 10/1992 | Nozaki | 49/441 |
| 5,319,883 A | * | 6/1994 | Gueneau et al. | 49/489.1 |
| 5,636,895 A | * | 6/1997 | Ito et al. | 296/146.9 |
| 7,306,839 B2 | * | 12/2007 | Kubo et al. | 428/122 |
| 7,571,569 B2 | * | 8/2009 | Hiramatsu et al. | 49/479.1 |
| 8,051,606 B2 | * | 11/2011 | Maaβ et al. | 49/479.1 |
| 2002/0058124 A1 | * | 5/2002 | Nakajima et al. | 428/99 |
| 2014/0059940 A1 | * | 3/2014 | Eguchi | 49/479.1 |

FOREIGN PATENT DOCUMENTS

JP   58078825 A   *   5/1983   ................ B60J 5/04
JP    3592564 B2    11/2004

* cited by examiner

*Primary Examiner* — Jerry Redman
(74) *Attorney, Agent, or Firm* — Foley & Lardner LLP

(57) ABSTRACT

A front door weatherstrip for motor vehicles has a wind-noise suppressing rib formed in a groove portion defined between a hollow sealing lip and a tongue-shaped sealing lip of the door weatherstrip to serve as a dam against a flow in a longitudinal direction of the groove portion. When these lips are elastically deformed by closing the front door, the wind-noise suppressing rib penetrates into a recess portion of the hollow sealing lip to overlap with the recess portion and to make the flow continuous by a bypass flow through the recess portion. Therefore, the front door weatherstrip is improved in at least drainage property without affecting sealing property and door closure property.

5 Claims, 7 Drawing Sheets

DOOR WEATHERSTRIP FOR MOTOR VEHICLES

BACKGROUND OF THE INVENTION

The present invention relates to the improvement of a door weatherstrip attached around motor vehicle doors and particularly to a door weatherstrip structure against wind noise at a portion of a front door directly above a waist portion (waist line) of the front door.

Japanese Patent No. 3592564 B2 (see FIG. 5) discloses a door weatherstrip structure for motor vehicles of this type, in which a groove defined between a main sealing portion and a sub sealing portion of the weatherstrip is provided with a wind suppressing block and a wind suppressing fin in the vicinity of the wind suppressing block. This wind suppressing fin is elastically deformed by air flowing through the groove and is brought into abutment with the bottom surface of the wind suppressing block.

SUMMARY OF THE INVENTION

In the door weatherstrip structure of Japanese Patent No. 3592564 B2, the wind flow through the groove is blocked by an abutment of the wind suppressing fin against the wind suppressing block. This is effective for the wind noise suppression, but at the same time makes the water flow through the groove inferior. Therefore, the water flowing through the groove may be stopped by the wind suppressing block and the wind suppressing fin to make the drainage through the groove inferior. With this, water in the groove may come out of the side of the main sealing portion, thereby lowering sealing property of the door weatherstrip.

In order to secure drainage through the groove, it is effective to make the width of the wind suppressing fin smaller. With this, however, it becomes difficult to make the wind suppressing fin receive the wind (air) flow through the groove, resulting in insufficiency in the wind noise suppression effect.

Furthermore, the wind suppressing block has a relatively large size. Therefore, depending on the behavior of the main sealing portion at it elastic deformation, there is a fear that the sealing property of the weatherstrip might be lowered by an interference between the wind suppressing block and the main sealing portion. Furthermore, there is a fear that the door closure property might become worse by the increase of reaction force at the door closure.

The present invention has been made in view of such problems of prior art. It is therefore an object of the present invention to provide a door weatherstrip having both of the wind noise suppressing effect and the drainage property without having adverse effects on the sealing property and the door closure property of the weatherstrip itself.

According to the present invention, there is provided a door weatherstrip for motor vehicles. This door weatherstrip includes:

a base portion fixed to a portion of a front door of a motor vehicle, the portion being directly above a waist portion of the front door;

a hollow sealing lip monolithically formed with the base portion, the hollow sealing lip being in an elastic abutment with a body panel of the motor vehicle when the front door is closed, the hollow sealing lip having a recess portion;

a tongue-like sub sealing lip monolithically formed with the base portion to define a groove between the hollow sealing lip and the tongue-like sub sealing lip, the groove joining with the recess portion of the hollowing sealing lip, the tongue-like sealing lip being in an elastic abutment with the body panel when the front door is closed; and a wind-noise suppressing rib projectingly formed at a position in the groove to serve as a dam against a flow in a longitudinal direction of the groove such that, when the hollow sealing lip and the tongue-like sub sealing lip are elastically deformed by closing the front door, the wind-noise suppressing rib penetrates into the recess portion of the hollow sealing lip to overlap with the recess portion and to make the flow continuous by a bypass flow through the recess portion.

As mentioned above, the wind-noise suppressing rib is projectingly formed at a position in the groove to serve as a dam against a flow in the longitudinal direction of the groove such that, when the hollow sealing lip and the tongue-like sub sealing lip are elastically deformed by closing the front door, the wind-noise suppressing rib penetrates into the recess portion of the hollow sealing lip to overlap with the recess portion and to make the flow continuous by a bypass flow through the recess portion. It is therefore possible to suppress or prevent wind noise by making air flow hit the wind-noise suppressing rib. Although the wind-noise suppressing rib is formed in the groove, the flow in the longitudinal direction of the groove is kept continuous by the bypass flow through the recess portion. It is therefore also possible to secure drainage property. The wind-noise suppressing rib does not have adverse effects on the sealing property and the door closure property. Thus, the door weatherstrip according to the present invention has both of the wind noise suppressing or preventing effect and the drainage property, while sufficiently securing the sealing property and the door closure property of the weatherstrip itself.

For example, when the motor vehicle is in a high-speed running, the rearward air flow through the groove becomes strong, thereby increasing wind noise. Under such condition, the wind-noise suppressing rib may elastically be deformed by an air flow through the groove such that the wind-noise suppressing rib is brought into abutment with an inner wall surface of the recess portion. With this, it is possible to further improve the wind noise suppressing or preventing effect by the wind-noise suppressing rib. In particular, when the motor vehicle is in a high-speed running in the rain, water downwardly running through the groove in a forward direction decreases due to the strong rearward air flow through the groove. Therefore, the drainage property becomes less important, and the abutment of the wind-noise suppressing rib with the inner wall surface of the recess portion does not substantially damage the drainage property.

In contrast with a high-speed running condition, for example, when the motor vehicle is at a stop or in a low- or normal-speed running in the rain, there is no strong air flow through the groove. Under such condition, water downwardly running through the groove in a forward direction increases, and the drainage property becomes important. Under this situation, the wind-noise suppressing rib is kept away from the inner wall surface of the recess portion to have a bypass flow through the recess portion. With this, it becomes possible to keep the flow in the longitudinal direction of the groove continuous.

The wind-noise suppressing rib may be formed on the tongue-like sub sealing lip to project toward the hollow sealing lip. With this, a portion of the wind-noise suppressing rib, which is positioned close to the hollow sealing lip, tends to bend by a strong air flow through the groove. Therefore, the wind-noise suppressing rib is more securely brought into abutment with an inner wall surface of the recess portion to further improve the wind noise suppressing or preventing effect by the wind-noise suppressing rib.

The wind-noise suppressing rib may be inclined toward the longitudinal direction of the groove and has a first portion close to the hollow sealing lip and a second portion close to the tongue-like sub sealing lip such that the first portion is at a frontward position of the motor vehicle than the second portion is. With this, water downwardly flowing in a frontward direction through the groove easily passes through the recess portion, thereby further improving drainage property of the door weatherstrip. Furthermore, even when air upwardly flows in a rearward direction through the groove, the inclined wind-noise suppressing rib easily receives air at the first portion. With this, the wind-noise suppressing rib is surely elastically deformed and brought into abutment with the inner wall surface of the recess portion, thereby further improving the wind noise suppressing or preventing effect by the wind-noise suppressing rib.

DETAILED DESCRIPTION

Figure 1:
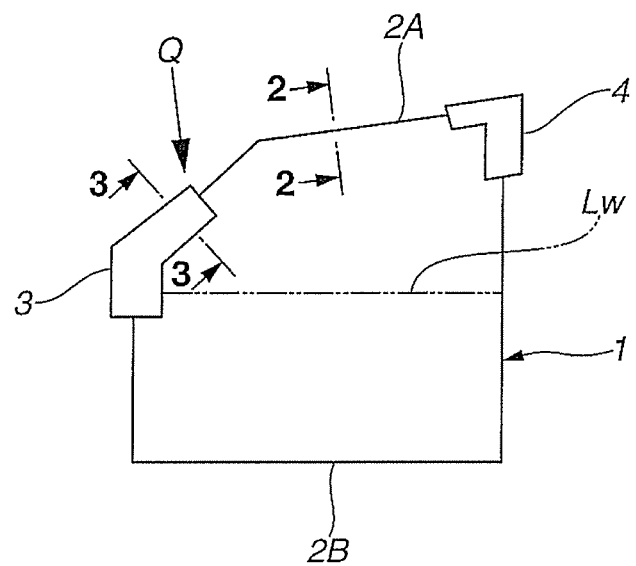
FIG. 1 is a schematic diagram showing a door weatherstrip attached around a motor vehicle front door.

With reference to FIGS. 1-8, a motor vehicle door weatherstrip according to the first embodiment of the present invention is described in the following. FIG. 1 shows a schematic structure of the door weatherstrip 1 attached around a front door (hereinafter simply "door") on the left side of a motor vehicle.

As shown in FIG. 1, the door weatherstrip 1 in the form of a generally hollow rubber ribbon is attached to a peripheral portion on the interior side of the door including a door sash to have a closed loop shape. As widely known, when the door is closed, the door weatherstrip 1 is brought into an elastic abutment with a periphery of a door opening on the vehicle body side, thereby sealing the door. This ensures airtightness, watertightness, sound insulation, etc. on the interior side.

In the door weatherstrip 1, (a) a general portion 2A (a portion along a roof part on the vehicle body side) corresponding to an upper edge portion of a door sash above a waist portion (waist line) Lw of the door and (b) another general portion 2B are connected with each other at a die-molded portion 3 positioned at a front end of the waist portion and a die-molded portion 4 positioned at a rear top corner portion of the door to have a closed loop shape as a whole. In FIG. 1, the width of each die-molded portion 3, 4 is exaggerated as compared with that of the general portion 2A, 2B.

Figure 2:
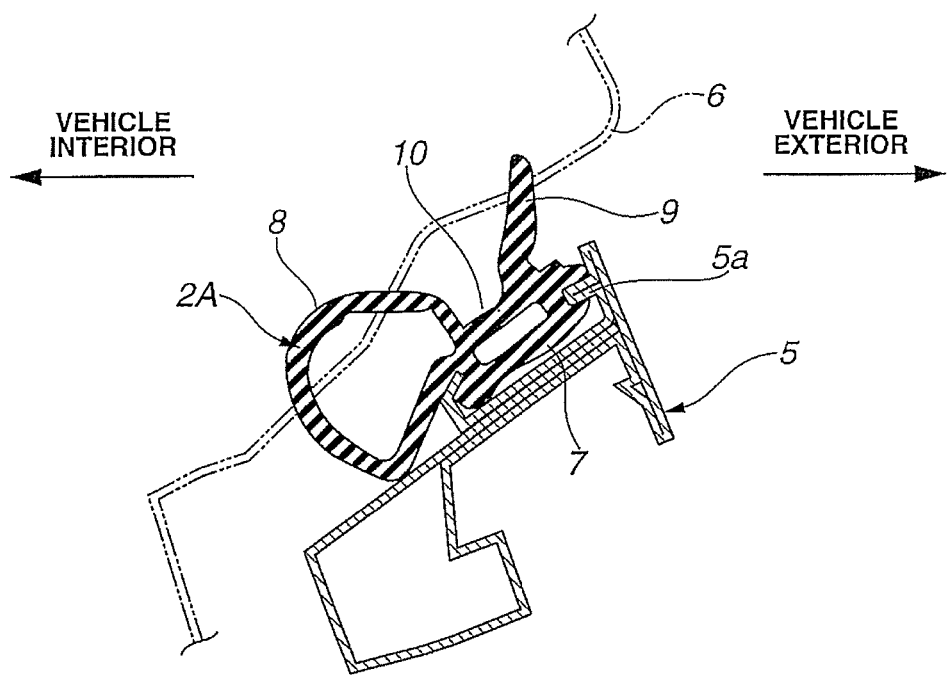
FIG. 2 is a sectional view taken along the lines 2-2 of FIG. 1.
Figure 3:
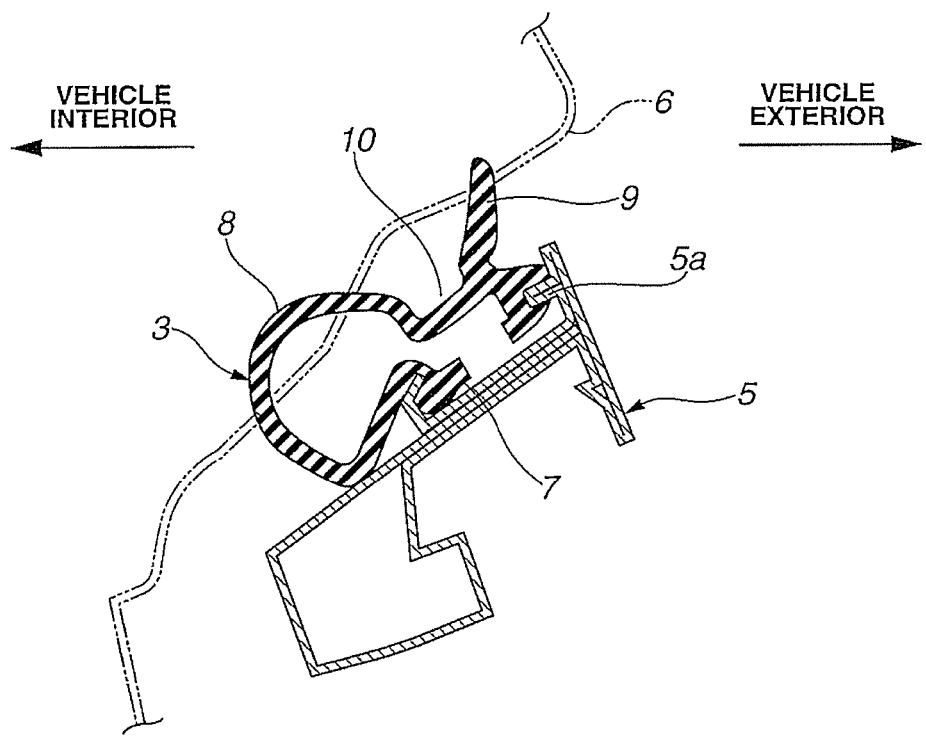
FIG. 3 is a sectional view taken along the lines 3-3 of FIGS. 1 and 4.

FIG. 2 shows a sectional view taken along the lines 2-2 at the general portion 2A. FIG. 3 shows a sectional view taken along the lines 3-3 at the die-molded portion 3 on the front side of the door. In FIGS. 2 and 3, the numeral 5 denotes a door sash as a part of the door, and the numeral 6 denotes a vehicle body panel, such as a front pillar, which is brought into a position close to the door sash 5 when closing the door.

As shown in FIGS. 2 and 3, at both of the general portion 2A and the die-molded portion 3, the door weatherstrip 1 is constituted of (a) a base portion 7, (b) a hollow sealing lip 8 monolithically formed with the base portion to project from the base portion 7, and (c) a tongue-like sub sealing lip 9 also monolithically formed with the base portion and positioned on the vehicle exterior side than the hollow sealing lip 8 is. The hollow sealing lip 8 and the sub sealing lip 9 are formed to be generally parallel to each other in a longitudinal direction, and a groove portion 10 is formed therebetween.

As shown in FIGS. 2 and 3, at least at a portion corresponding to the top edge of the door sash, each of the general portion 2A and the die-molded portion 3 is fit onto a retainer 5a of the door sash 5. When closing the door, both of the hollow sealing lip 8 and the sub sealing lip 9 are brought into abutment with a door opening periphery of a vehicle body panel 6. With this, at least at a portion corresponding to the general portion 2A and the die-molded portion 3, the door is so-called double sealed at between the vehicle body panel 6 and the door sash 5.

As shown in FIG. 1, in the vicinity of the front end portion of the door, at least the die-molded portion 3 is disposed at a position that is above and in the vicinity of the waist portion Lw. Therefore, the die-molded portion 3 serves as a portion of the door weatherstrip 1 positioned directly above the waist portion Lw.

Figure 4:
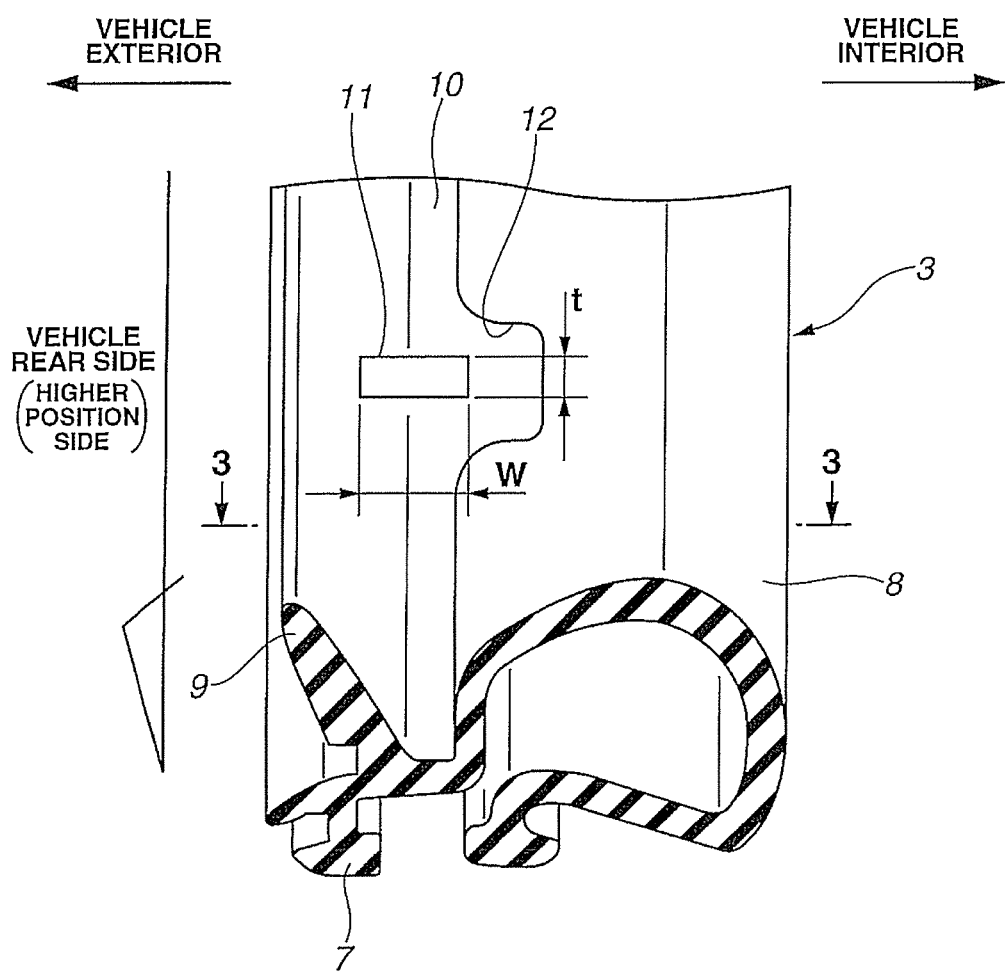
FIG. 4 is a schematic view taken along the direction of "Q" of FIG. 1, showing a door weatherstrip according to the first embodiment of the present invention, when the front door is open.

FIG. 4 is a view showing the die-molded portion 3, taken from above along the direction of "Q" of FIG. 1. This shows the hollow sealing lip 8 and the sub sealing lip 9 under a free state when the door is open. As mentioned above, the groove portion 10 is formed in a longitudinal direction between the hollow sealing lip 8 and the sub sealing lip 9 (see FIG. 4). In this groove, the wind-noise suppressing rib 11 is projectingly formed in the form of a dam to have a thickness of "t", a width of "W", and a predetermined height (see FIG. 7). This wind-noise suppressing rib 11 is formed on a base side of the sub sealing lip 9 to project from the sub sealing lip 9 toward the hollow sealing lip 8 (see FIG. 6). In other words, the wind-noise suppressing rib 11 monolithically joins at its two surfaces with the sub sealing lip 9 and a wall surface of the groove portion 10. The wind-noise suppressing rib 11 is formed to be perpendicular to the longitudinal direction of the groove portion 10.

As shown in FIG. 4, in the vicinity of the wind-noise suppressing rib 11 on the side of the groove portion 10, a part of a base portion of the hollow sealing lip 8 is formed with a recess portion 12 having a generally rectangular shape in planar view by making a recess in a direction opposite to the wind-noise suppressing rib 11. The opening width of this recess portion 12 in the longitudinal direction of the groove portion 10 is designed to be sufficiently longer than the thickness "t" of the wind-noise suppressing rib 11 to have an enough bypass flow through the recess portion 12. Although the wind-noise suppressing rib 11 is formed in the form of a dam in the middle of the groove portion 10 in a manner to interrupt a flow through the groove portion 10, the recess portion 12 is formed at a position adjacent to the wind-noise suppressing rib 11. Therefore, as shown in FIG. 4, when the hollow sealing lip 8 and the sub sealing lip 9 are in a free state, the flow through the groove portion 10 in the longitudinal direction is kept continuous by a bypass flow through the recess portion 12 to go around the wind-noise suppressing rib 11.

The door weatherstrip functions differently as explained hereinafter, when wind passes rearwardly through the groove as the motor vehicle travels and when water of rainwater etc. flows frontward down the groove.

Figure 5:
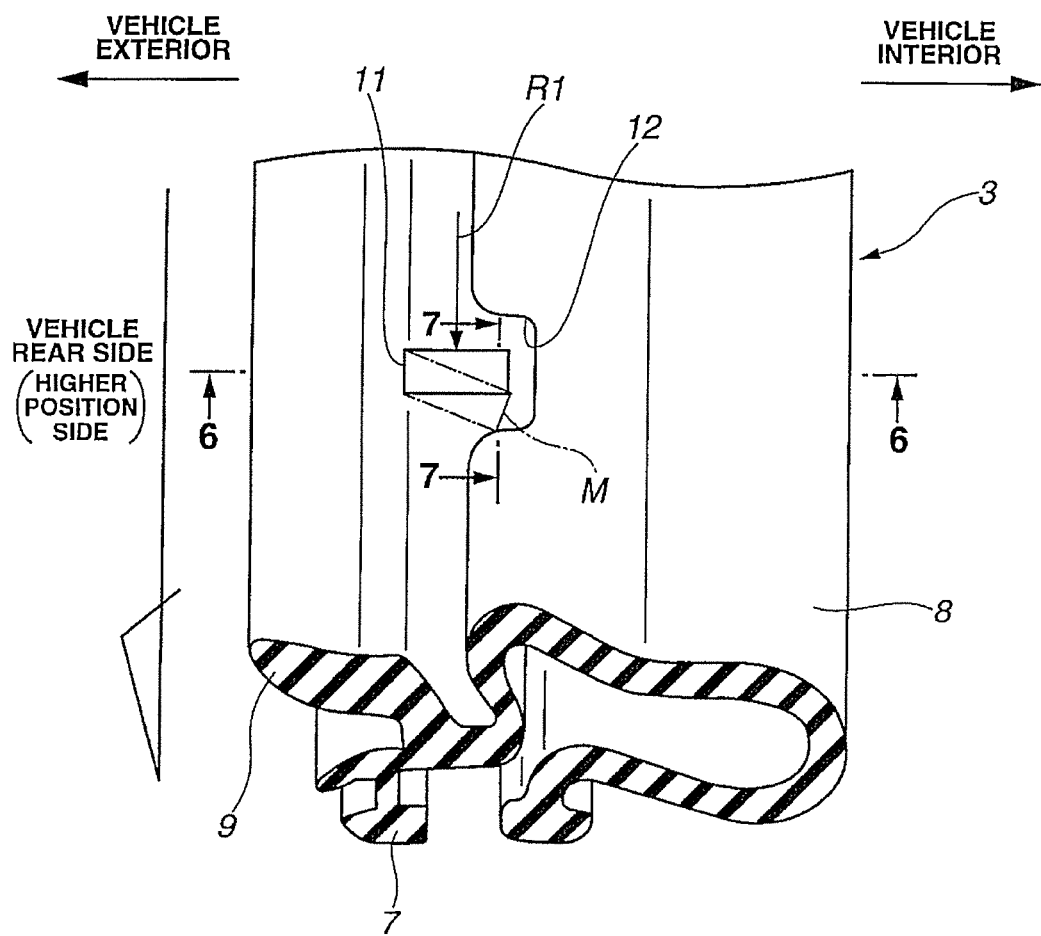
FIG. 5 is a view similar to FIG. 4, but showing the movement of the wind-noise suppressing rib receiving air flowing through the groove of the weatherstrip, when the front door is closed.
Figure 6:
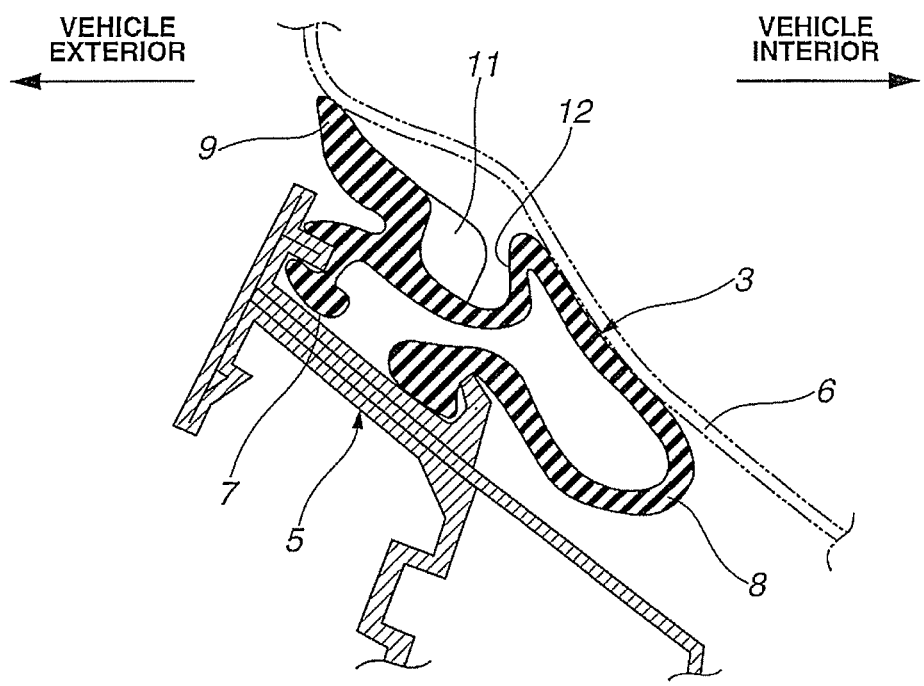
FIG. 6 is a sectional view taken along the lines 6-6 of FIG. 5.
Figure 7:
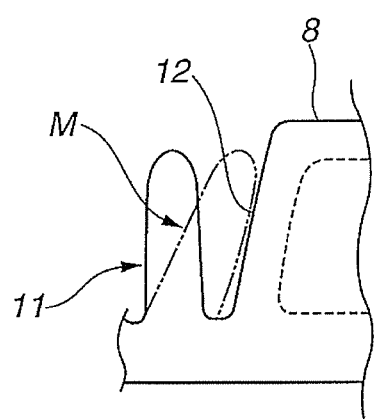
FIG. 7 is a sectional view taken along the lines 7-7 of FIG. 5, schematically showing the movement of the wind-noise suppressing rib against the inner wall surface of the recess portion.
Figure 8:
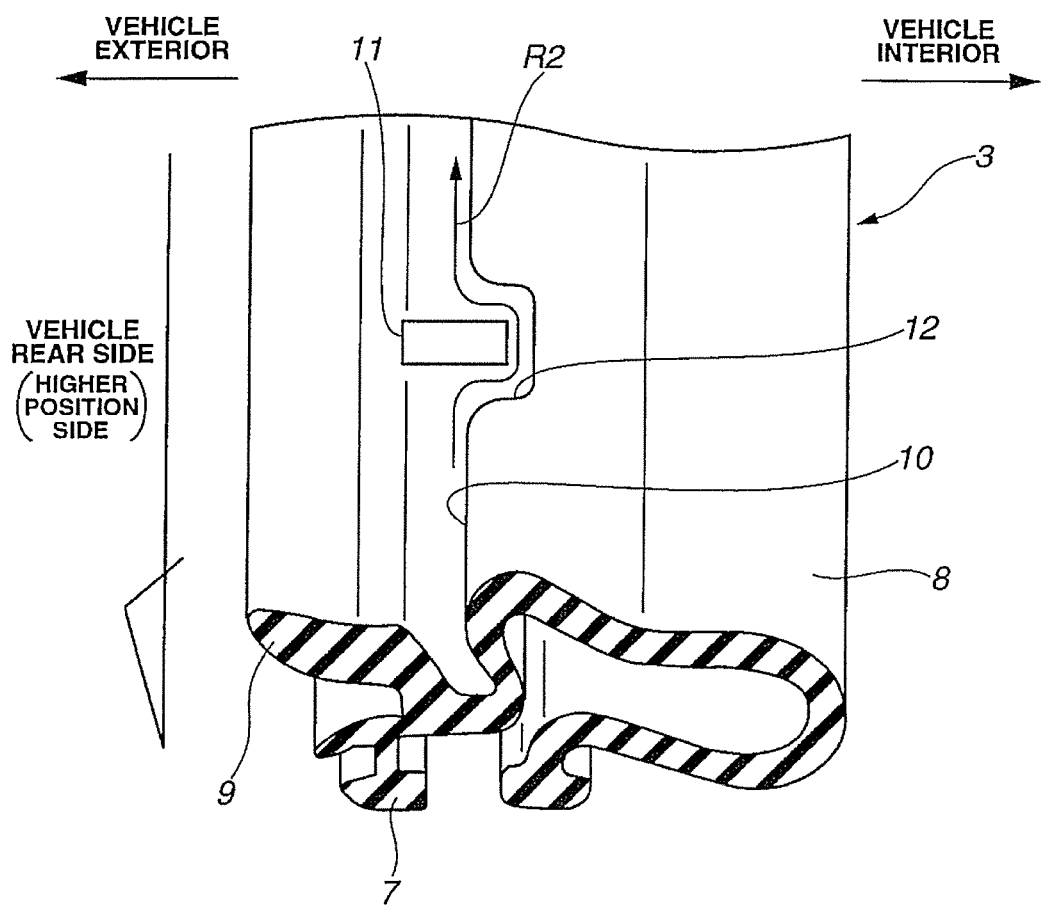
FIG. 8 is a view similar to FIG. 5, but showing the movement of water flowing through the groove and the recess portion.

FIG. 5 shows a condition in which the hollow sealing lip 8 and the sub sealing lip 9 are elastically deformed by an elastic abutment with the vehicle body panel 6 (see FIGS. 2 and 3) when the door is closed, in contrast with a free state shown in FIG. 4. FIGS. 6 and 7 are sectional views respectively taken along the lines 6-6 and 7-7 of FIG. 5.

As shown in FIG. 5, when the hollow sealing lip 8 and the sub sealing lip 9 are elastically deformed, a part of the hollow sealing lip 8 is displaced toward the sub sealing lip 9. Therefore, the width of the groove portion 10, which is defined between a base portion of the sub sealing lip 9 and the hollow sealing lip 8, is narrowed, as compared with a free state shown in FIG. 4. With this, as shown in FIG. 5, a part of the wind-noise suppressing rib 11 penetrates into the recess portion 12. In other words, the recess portion 12 receives a part of the wind-noise suppressing rib 11, and the recess portion 12 and the wind-noise suppressing rib 11 overlap with each other in a direction of a section perpendicular to the longitudinal direction.

For example, when the motor vehicle is at a stop or in a low- or normal-speed running in the rain, there is no strong air flow rearwardly passing through the groove. Under such condition, water downwardly running through the groove in a forward direction increases, and the drainage property becomes important. Under this situation, the wind-noise suppressing rib 11 as shown by a solid line of FIG. 5 maintains its original shape and is kept away from the inner wall surface of the recess portion to have a predetermined gap therebetween. Therefore, the flow through the groove portion 10 is kept continuous by a bypass flow through the recess portion 12 as shown by arrow R2 of FIG. 8, thereby achieving a smooth water flow (drainage) in a frontward direction down the groove portion 10.

In contrast, for example, when the motor vehicle is in a high-speed running, the rearward air flow through the groove becomes strong, thereby increasing wind noise. Under such condition, the wind-noise suppressing rib 11, which monolithically joins at its two surfaces with the sub sealing lip 9 and a wall surface of the groove portion 10, is elastically deformed or twisted at its end portion close to the hollow sealing lip 8 by wind pressure as schematically shown by a dash-dotted line of FIG. 5 and an imaginary line M of FIG. 7 such that the wind-noise suppressing rib is brought into abutment with an inner wall surface of the recess portion 12. This abutment blocks the flow continuity in the longitudinal direction of the groove portion 10 to substantially stop air flow through the groove portion 10 as shown by arrow R1 of FIG. 5. With this, it becomes possible to prevent or suppress the occurrence of wind noise, for example, at the die-molded portion 3 as the motor vehicle travels in a high speed. Under such condition in a high-speed running, water downwardly running through the groove in a forward direction decreases due to the strong rearward air flow through the groove. Therefore, the drainage property becomes less important, and the abutment of the wind-noise suppressing rib with the inner wall surface of the recess portion does not damage the drainage property.

Thus, it is possible to sufficiently obtain both the wind-noise suppressing effect and the drainage property by the door weatherstrip of the first embodiment, while the existence of the wind-noise suppressing rib 11 and the recess portion 12 does not have any adverse effects on the sealing property and the door closure property of the weatherstrip itself.

Figure 9:
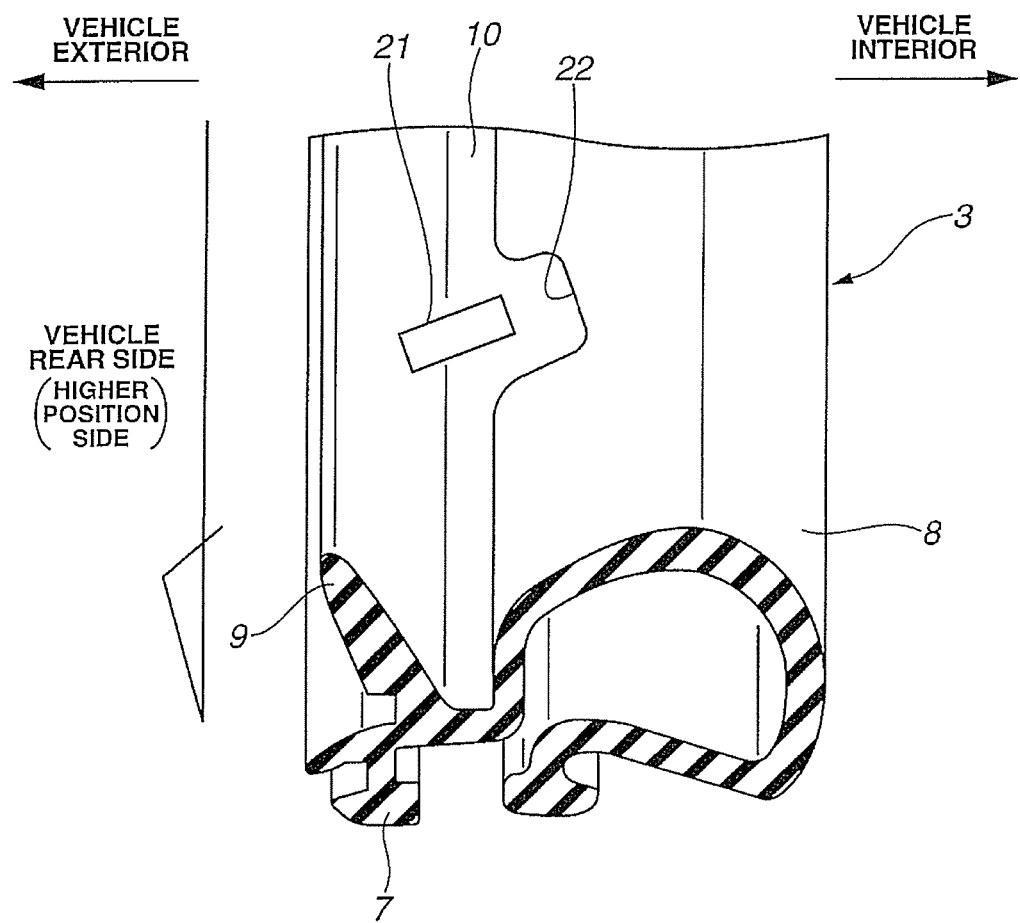
FIG. 9 is a view similar to FIG. 4, but showing a door weatherstrip according to the second embodiment of the present invention.

With reference to FIG. 9, a door weatherstrip according to the second embodiment of the present invention is described in the following. In FIG. 9, parts similar to those of FIG. 4 are designated by the same reference numerals.

In this door weatherstrip, the wind-noise suppressing rib 21 formed in the groove portion 10 is inclined toward the longitudinal direction of the groove portion 10. More specifically, a first portion of the wind-noise suppressing rib 21, close to the hollow sealing lip 8, is at a frontward position of the motor vehicle than a second portion of the wind-noise suppressing rib 21, close to the sub sealing lip 9, is. To correspond to the inclination of the wind-noise suppressing rib 21, the recess portion 22 is also inclined in the same direction.

The door weatherstrip according to the second embodiment brings about advantageous effects similar to those of the door weatherstrip according to the first embodiment. Furthermore, as shown in FIG. 9, the wind-noise suppressing rib 21 is inclined. This means that the upper wall surface of the wind-noise suppressing rib 21 for receiving the drainage water flowing down in a forward direction is downhill from the sub sealing lip 9 toward the hollow sealing lip 8, for example, when the motor vehicle is at a stop in the rain or in a low- or normal-speed running in the rain. Therefore, the drainage water flows smoothly along the upper wall surface of the wind-noise suppressing rib 21 and then through the recess portion 22. When the motor vehicle is in a high-speed running, the wind-noise suppressing rib 21 tends to more easily receive wind (air) flowing in a rearward direction through the groove portion 10. With this, the wind-noise suppressing rib 21 is more easily bent and brought into abutment with the inner wall surface of the recess portion 22. Therefore, it is possible to more assuredly obtain the wind noise preventing or suppressing effect.

Although the invention has been described above by reference to certain embodiments of the invention, the invention is not limited to the embodiments described above. Modifications and variations of the embodiments described above will occur to those skilled in the art, in light of the above teachings.

The entire disclosure of Japanese Patent Application No. 2014-75861 filed on Apr. 2, 2014, of which priority is claimed in the present application, including specification, drawings, claims and summary, is incorporated herein by reference in its entirety.

What is claimed is:

1. A door weatherstrip for a motor vehicle, comprising:
   a base portion fixed to a portion of a front door of a motor vehicle, the portion being directly above a waist portion of the front door;
   a hollow sealing lip monolithically formed with the base portion, the hollow sealing lip being in an elastic abutment with a body panel of the motor vehicle when the front door is closed, the hollow sealing lip having a recess portion;
   a tongue-shaped sub sealing lip monolithically formed with the base portion to define a groove between the hollow sealing lip and the tongue-shaped sub sealing lip, the groove joining with the recess portion of the hollow sealing lip, the tongue-shaped sub sealing lip being in an elastic abutment with the body panel when the front door is closed; and a wind-noise suppressing rib projectingly formed at a position in the groove to serve as a dam against a flow of air or water in a longitudinal direction of the groove such that, when the hollow sealing lip and the tongue-shaped sub sealing lip are elastically deformed by closing the front door, the wind-noise suppressing rib penetrates into the recess portion of the hollow sealing lip to overlap with the recess portion and to make the flow of air or water continuous by a bypass flow of air or water through the recess portion.

2. The door weatherstrip as claimed in claim 1, wherein the wind-noise suppressing rib is elastically deformed by an air flow through the groove such that the wind-noise suppressing rib is brought into abutment with an inner wall surface of the recess portion.

3. The door weatherstrip as claimed in claim 2, wherein the wind-noise suppressing rib is formed on the tongue-shaped sub sealing lip to project toward the hollow sealing lip.

4. The door weatherstrip as claimed in claim 3, wherein the wind-noise suppressing rib is monolithically joined with the tongue-shaped sub sealing lip and a wall surface of the groove.

5. The door weatherstrip as claimed in claim 3, wherein the wind-noise suppressing rib is inclined toward the longitudinal direction of the groove and has a first portion close to the hollow sealing lip and a second portion close to the tongue-shaped sub sealing lip such that the first portion is at a frontward position of the motor vehicle compared to the second portion.

* * * * *